Jan. 2, 1945.  E. G. GERBER  2,366,394
TESTING MACHINE
Filed Oct. 28, 1943
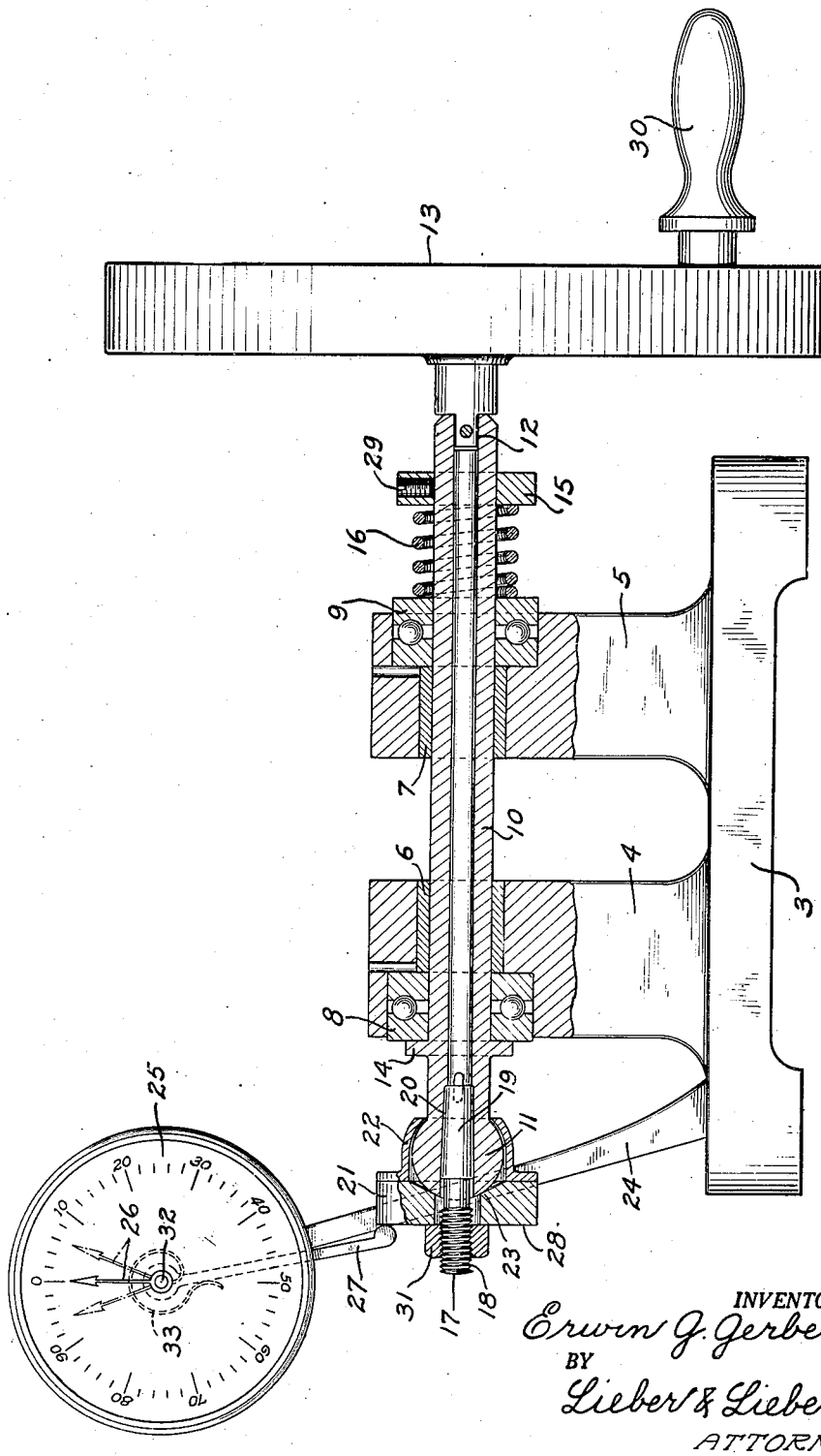
INVENTOR.
Erwin G. Gerber
BY
Lieber & Lieber
ATTORNEYS.

Patented Jan. 2, 1945

2,366,394

UNITED STATES PATENT OFFICE 2,366,394

TESTING MACHINE

Erwin G. Gerber, West Allis, Wis., assignor to Meta Manufacturing Co., Milwaukee, Wis., a partnership Application October 28, 1943, Serial No. 508,036

5 Claims. (Cl. 33—199)

The present invention relates generally to improvements in the art of inspecting or testing diverse articles in an effort to detect structural imperfections, and relates more specifically to improvements in the construction and operation of mechanisms for testing articles such as screw threaded nuts or the like.

The primary object of my invention is to provide a new and useful testing machine which is simple in construction and highly efficient in operation.

In the manufacture of threaded clamping elements such as nuts for certain uses, it is extremely desirable, and in fact essential, that the internal screw threads of the nuts be accurately formed, and that the clamping faces of the elements be disposed absolutely perpendicular to the longitudinal central axes thereof, in order that maximum frictional contact and clamping effect will result when the nuts are subsequently applied to receiving elements and are driven home, and so that the nuts will remain in most effective clamping position. While machinery for accurately constructing these fastening nuts is available, it frequently happens during high speed quantity production thereof, that some of the nuts are not perfectly formed, and all of the product must therefore be carefully inspected and tested before delivery thereof from the factory to the user. Due to the large number of these nuts that require handling and inspection, the present methods of individually testing or inspecting the screw threads and the clamping faces are not only laborious and costly, but they are also too slow and relatively inefficient, as compared to a mode of simultaneously gauging the threaded elements for both of these types of defects.

It is therefore a more specific object of the present invention to provide an improved nut testing mechanism which is adapted to quickly and effectively reveal all important structural defects in such articles, and which therefore materially enhances production and final inspection thereof.

Another specific object of my present invention is to provide a simple, compact and durable machine for rapidly but accurately testing threaded clamping elements such as nuts or the like.

A further specific object of this invention is to provide an improved mechanical assemblage for simultaneously promptly revealing defects in either thread formation or misalinement of the clamping faces of successive threaded nuts or the like.

Still another specific object of the invention is to provide an improved nut testing device which can be manipulated by inexperienced operators to product accurate results, and which may also be manufactured at moderate cost.

These and other specific objects and advantages of the invention will be apparent from the following detailed description.

A clear conception of one typical embodiment of my invention, and of the mode of constructing and of operating testing machines built in accordance with the improvement, may be had by referring to the drawing accompanying and forming a part of this specification wherein like reference characters designate similar parts.

The single figure of the drawing is a part sectional side elevation of one of my improved nut testing machines, the section being taken centrally therethrough along a vertical plane.

While the invention has been shown and described herein as having been embodied in a manually operable machine especially adapted to test hexagonal internally threaded nuts, it is not my desire or intent to thereby unnecessarily restrict the scope or the utility of the improved features.

Referring to the drawing, the improved nut testing machine shown therein, comprises in general a main base or frame 3 having spaced bearing pedestals 4, 5 extending upwardly therefrom; horizontal guide bearings 6, 7 mounted in the pedestals 4, 5 respectively; anti-friction thrust bearings 8, 9 also mounted in the pedestals 4, 5 respectively; an elongated hollow element or shaft 10 journalled for rotation in the guide bearings 6, 7 and having an integral spherical enlargement or head 11 at one end, and a driving notch or recess 12 at its opposite end; a driving member 13 cooperable with the recess 12 of the shaft 10 to rotate the same; a flange 14 formed integral with the shaft 10 near the head 11 and coacting with the adjacent thrust bearing 8; a collar 15 adjustably secured to the shaft 10 near the recess 12 and coacting with one end of a compression spring 16 the opposite end of which coacts with the adjacent thrust bearing 9; a threaded spindle 17 having screw threads 18 of predetermined shape and dimensions at one end, and also having a tapered opposite end shank 19 frictionally engaging a tapered central socket 20 in the headed end of the shaft 10; a rocker member 21 loosely suspended from the spherical shaft head 11 by means of a retainer cap 22 and having an inner edge 23 adapted to ride upon the spherical zone surface of the head 11; and a gage or indicator supported from the frame 3 by a bracket 24 and consisting of a calibrated dial 25 and a pointer 26 cooperating with the dial and having an actuating lever or arm 27 coacting with the outer plane face 28 of the member 21.

The frame 3 may be constructed in any suitable manner and of any desirable material, and the bearing pedestals 4, 5 may be formed integral with the frame, as shown. While the guide bearings 6, 7 may be of the ordinary sleeve type, the end thrust bearings 8, 9 are preferably of an anti-friction type such as ball or roller bearings; and the tension of the spring 16 which coacts with the collar 15, should be sufficient to constantly maintain the flange 14 in snug contact with the rotary element of the thrust bearing 8 in order to positively prevent axial shifting or displacement of the main shaft 10. The collar 15 is adjustably and detachably secured to the shaft 10 by means of a set screw 29, and the driving member 13 which is shown as consisting of a wheel provided with a handle 30 but which may be of any other suitable type, is preferably detachably secured within the shaft end recess 12, so that by removing the collar 15 and the member 13, the shaft 10 may be slid axially from within the bearings 6, 7, 8, 9.

The integral end head 11 of the shaft 10, should be accurately machined to provide a spherical zone surface with which the inner edge 23 of the rocker member 21 is adapted to coact, and the member 21 should also be accurately formed so that the circular edge 23 is disposed in a plane which is precisely parallel to the plane of the outer flat surface 28 thereof. The retainer cap 22 which may be secured to the rocker member 21 in any suitable manner, serves merely to prevent the member 21 from dropping out of place, and should not interfere with the free rocking movement of the member when imperfect threaded articles are driven against the surface 28. The threaded spindles 17 should also be accurately constructed with screw threads 18 of proper diameter and shape for cooperation with the internal threads of the nuts 31 which are to be inspected or tested; and while the tapered shanks 19 of the spindles 17 should be formed to normally hold the spindles rigid with the shaft 10, they should preferably permit the spindles 17 to be driven out of the socket 20 for replacement by other spindles 17 having different thread formations, when it is desired to utilize the machine for testing other sizes or types of nuts 31.

The indicator which is shown rather diagrammatically in the drawing, is of relatively standard construction and may be of any suitable type having the dial 25 thereof calibrated to designate central and opposite off-center positions of the pointer 26. In the drawing, the pointer has been shown in solid lines in central position and in dot-and-dash lines in opposite off-center positions; and while the pointer actuating lever or arm 27 which coacts with the plane surface 28 of the rocker member 21 has been shown as being direct connected to the pointer supporting pivot 32, the sensitiveness of the gage may obviously be enhanced by interposing motion augmenting mechanism such as gearing between the arm 27 and the pointer 26. In order to maintain the lower extremity of the arm 27 in contact with the plane surface 28 at all times, a spring 33 or other suitable means may be provided, and as previously indicated, the gage or indicator is of well known construction and may be of diverse construction so long as wobbling movement of the surface 21 when rotated, is properly transmitted to a pointer 26 or other suitable visible indicator.

During normal operation of the improved testing machine, and after the various parts thereof have been properly constructed and assembled, the successive threaded nuts 31 which are to be inspected, should be applied to the screw threads 18 of the spindle 17. The operator when applying the nuts 31 to the accurately formed threads 18 by hand, can readily feel whether the internal threads of the nuts 31 are too large or too small or otherwise defective, and the imperfectly threaded nuts should be discarded before further testing proceeds. If the nuts 31 are properly threaded and cooperate properly with the gage threads 18, then the operator proceeds to screw each nut 31 in succession upon the spindle threads 18 until the clamping face of the nut snugly engages the plane surface 28 of the tilting member 21.

When the clamping face of a nut 31 is perfectly formed, it will retain the member 21 with the surface 28 truly perpendicular to the longitudinal axis of the shaft 10, whenever the clamping face of such a perfect nut is brought into snug engagement with the surface 28; and if the shaft and nut assembly is subsequently rotated by revolving the handle 30, the pointer 26 of the gage will remain at zero reading since the lever arm 27 will not be oscillated during rotation of the plane contact surface 28. However, if the clamping face of a nut 31 is not truly perpendicular to the central nut axis, the member 21 will be tilted or rocked upon the spherical zone surface of the head 11 when the imperfect clamping surface of the nut is brought into snug contact with the member surface 28, and the surface 28 will be held in such tilted position. When the shaft and nut assembly is thereafter rotated with the aid of the handle 30, the revolving tilted member 21 will wobble and causes the pointer 26 to swing back and forth to the opposite sides of the zero reading, as illustrated by the dot-and-dash lines in the drawing. The imperfectly faced nuts 31 should then be removed from the spindle 17 and discarded, and the inspection or testing of the successive nuts can thus be quickly and accurately effected.

From the foregoing detailed description of the construction and operation of the improvement, it will be apparent that the present invention provides an improved testing machine for threaded articles such as nuts 31, which is extremely simple and compact in construction and highly efficient in use. The improved assemblage obviously enables the operator to quickly make dual inspection of each of the successive nuts 31, both as to thread and clamping face inaccuracies, thereby greatly facilitating production. By replacing the spindle 17 with other interchangeable threaded spindles of different types, various styles and sizes of nuts 31 may be tested with the same machine, and the relatively simple parts of the apparatus may be readily constructed and assembled or dismantled. By virtue of the fact that the plane surface 28 of the rocking or wobbling member 21 is of relatively large diameter and coacts with the pointer actuating arm 27 considerable distance from the central axis of the machine, inaccuracies in facing of the nuts 31 will be considerably enlarged or multiplied at the pointer 26, and the spring 16 functions to prevent axial shifting of the shaft 10 such as might otherwise affect the accuracy of the readings. The improved testing apparatus has proven highly satisfactory and successful in actual use, and can be manufactured at moderate cost and used to inspect threaded articles of diverse types. While the spindle 17 which is rigidly attached to and forms a part of the rotary shaft element 10, is threaded for coaction with threaded nuts 31, this threading may be omitted when the mechanism is utilized to test articles which are merely centrally bored and have end faces which must be perpendicular to the axes of the bores.

It should be understood that it is not desired to limit this invention to the exact details of construction or to the precise mode of operation, herein shown and described, for various modifications within the scope of the appended claims may occur to persons skilled in the art.

I claim:

1. In combination, a rotary element having an end projection for snugly receiving successive articles each having an opening and an end face adjoining its opening, means for rotating said element about the central axis of said projection, a member rotatable by said element and having an outwardly extending surface adjacent to said projection, said member being tiltable relative to said axis for surface engagement with the tilted end face of a defective article which is snugly applied to said projection, and means coacting with said surface for indicating imperfections in said article faces when said element is rotated and by virtue of the tilted disposition of the surface.

2. In combination, a rotary shaft having a coaxial screw threaded end projection for receiving threaded nuts each having a threaded central opening and an end clamping face adjoining its opening, means for rotating said shaft about its central axis, a member rotatable by said shaft and having an outwardly extending surface adjacent to said projection, said member being tiltable relative to said surface for surface engagement with the tilted clamping face of a defective nut applied to the screw threads of said projection, and means coacting with said surface for indicating imperfections in said nut faces when said shaft is rotated and by virtue of the tilted disposition of the surface.

3. In combination, a rotary shaft having a coaxial screw threaded end projection for receiving threaded nuts each having a threaded central opening and an end clamping face adjoining its opening, means for rotating said shaft about its central axis, a member surrounding and rotatable by said shaft and having an outwardly extending surface adjacent to said projection, said member being tiltable relative to said surface for surface engagement with the tilted clamping face of a defective nut applied to the screw threads of said projection, and an indicating pointer operable by the wobbling motion of said surface when engaged by the tilted clamping face of a defective nut to indicate imperfections in the nuts.

4. In combination, a rotary shaft having an end projection for snugly receiving successive articles each having a central opening and an end face adjoining its opening, means for rotating said shaft about its central axis, a member surrounding and rotatable by said shaft and having an outwardly extending surface adjacent to said projection, said member being universally rockable relative to said axis for surface engagement with the end face of a defective article which is snugly applied to said projection, and means coacting with said surface for visibly indicating improper disposition of the end face of an article applied to said projection and coacting with said surface when said shaft is rotated.

5. In combination, a rotary shaft having a spherical zone surface near one end thereof and a coaxial projection extending outwardly beyond said surface and formed for snug reception of successive articles each having a central opening and an end face adjoining its opening, means for rotating said shaft about its central axis, a member rockably engaging said spherical surface and having a plane surface extending away from said projection, said member being rockable relative to said shaft axis for surface engagement with the tilted end face of a defective article which is snugly applied to said projection, and means coacting with said plane surface for visibly indicating imperfections in said article faces when said element is rotated and by virtue of the wobbling motion of the surface.

ERWIN G. GERBER.